(12) United States Patent
Malek

(10) Patent No.: US 8,694,771 B2
(45) Date of Patent: Apr. 8, 2014

(54) METHOD AND SYSTEM FOR A CERTIFICATE-LESS AUTHENTICATED ENCRYPTION SCHEME USING IDENTITY-BASED ENCRYPTION

(75) Inventor: Behzad Malek, Toronto (CA)

(73) Assignee: Connect In Private Panama Corp., Panama (PA)

( * ) Notice: Subject to any disclaimer, the term of this patent is extended or adjusted under 35 U.S.C. 154(b) by 42 days.

(21) Appl. No.: 13/370,491

(22) Filed: Feb. 10, 2012

(65) Prior Publication Data
US 2013/0212377 A1 Aug. 15, 2013

(51) Int. Cl.
*H04L 9/30* (2006.01)
*H04L 9/00* (2006.01)

(52) U.S. Cl.
CPC .. *H04L 9/00* (2013.01); *H04L 9/30* (2013.01); *H04L 9/3066* (2013.01); *H04L 9/3073* (2013.01)
USPC .......................... 713/155; 713/165; 380/277

(58) Field of Classification Search
CPC ........................................................ H04L 9/00
USPC .......................................... 713/155; 380/277
See application file for complete search history.

(56) References Cited

U.S. PATENT DOCUMENTS

| | | | |
|---|---|---|---|
| 7,113,594 B2 | 9/2006 | Boneh et al. | |
| 7,239,701 B1 | 7/2007 | Ogishi et al. | |
| 2003/0081785 A1* | 5/2003 | Boneh et al. | 380/277 |
| 2005/0089173 A1* | 4/2005 | Harrison et al. | 380/277 |
| 2005/0102507 A1* | 5/2005 | Sozzani et al. | 713/165 |
| 2010/0208895 A1 | 8/2010 | Boneh et al. | |

OTHER PUBLICATIONS

Malek, B., & Miri, A. (Aug. 2009). Combining attribute-based and access systems. In Computational Science and Engineering, 2009. CSE'09. International Conference on (vol. 3, pp. 305-312). IEEE.*
Bethencourt, J., Sahai, A., & Waters, B. (May 2007). Ciphertext-policy attribute-based encryption. in Security and Privacy, 2007. SP'07. IEEE Symposium on (pp. 321-334). IEEE.*
Tao Du; Shouniing Qu; Guangyu Zheng; Jingwen Xu; Linqiang Dong, "An Efficient Cerificateless ID-based Singcrption Scheme Based on Pair Public Key", Networked Computing (INC), 2010 6th Internation Conference, pp. 1-6, May 11-13, 2010.
Aijun Ge; Shaozhen Chen; Xinyi Haung, "A Concrete Certificateless Signature Scheme without Pairings", Multimedia Information Networking and Security, 2009. MINES '09 International Conference, vol. 2, no., pp. 374, 377, Nov. 18-20, 2009.

* cited by examiner

*Primary Examiner* — Carl Colin
*Assistant Examiner* — Syed Zaidi
(74) *Attorney, Agent, or Firm* — Riches, McKenzie & Herbert, LLP

(57) ABSTRACT

A method of verifying public parameters from a trusted center in an identity-based encryption system prior to encrypting a plaintext message by a sender having a sender identity string may include: identifying the trusted center by a TC identity string, the trusted center having an identity-based public encryption key of the trusted center based on the TC identity string; determining if the sender has a sender private key and the public parameters for the trusted center including the public encryption key of the trusted center and a bilinear map; and verifying the public parameters using the TC identity string prior to encrypting the plaintext message into a ciphertext by comparing values of the bilinear map calculated with variables from the trusted center. The ciphertext may include a component to authenticate the sender once the ciphertext is received and decrypted by the recipient using the private key of the recipient.

15 Claims, 9 Drawing Sheets

METHOD AND SYSTEM FOR A CERTIFICATE-LESS AUTHENTICATED ENCRYPTION SCHEME USING IDENTITY-BASED ENCRYPTION

FIELD OF THE INVENTION

This invention relates to a certificate-less authenticated encryption scheme and, in particular, an encryption scheme using identity strings to provide identity-based encryption.

BACKGROUND OF THE INVENTION

Cryptographic encryption algorithms add confidentiality to sensitive data that is transmitted over an insecure channel. The data is protected, as the encryption algorithm transforms the data from plaintext into ciphertext prior to transmission. The recipient of the encrypted data is only able to decrypt the ciphertext and retrieve the plaintext from the received transmission if the recipient is able to reverse the encryption algorithm. If the encryption and decryption algorithms share the same key, the cryptosystem is known as "symmetric" and the algorithms are called symmetric-key algorithms. If the key in the encryption algorithm is different than the key in the decryption algorithm, the cryptosystem is known as "asymmetric" and the algorithms are called asymmetric-key algorithms.

In asymmetric-key algorithms, the key used for encryption (i.e. the "public key") is publicly known, as everyone should be able to use it to encrypt sensitive data. However, the key used in the decryption (i.e. the "private key") is only known to the intended receiver of the encrypted data and is protected such that the intended receiver is the only entity able to decrypt the encrypted message. An asymmetric cryptosystem is commonly referred to as a Public Key Cryptosystem (PKC).

In a PKC, the public key and the private key are independent of each other such that knowledge of the public key does not reveal or lead to the private key. In other words, the public key can be made public such that anyone can encrypt data for a specific recipient, but only the specific recipient has knowledge of the private key and is able to utilize the private key to decrypt and retrieve the data. Since the public keys in the PKC are publicly known, they are considered insensitive and can be transmitted over any insecure, public channel. However, the main challenge with the PKC is to trust whether an available public key is actually associated with the intended recipient. In other words, if a different public key (i.e. a wrong or modified public key) is used by mistake or by fraud, the overall security achieved by utilizing encryption is compromised. The security of the encryption in a Public Key Cryptosystem therefore relies on correctly distributing the public keys that belong to or are associated with the intended recipients of the encrypted message. Accordingly, it is necessary to verify the public keys before encrypting sensitive data with a public key in a PKC.

Since large systems are dynamic and new members join or leave the system at all times, public keys are constantly issued and/or revoked. At the time of registration (setup), a new member is assigned a new set of public/private keys and all the other existing members are notified of the new public key before they can securely communicate with the new member, using the new public key generated.

In the PKC, there are two mechanisms for generating and distributing the public keys throughout the system. In the first mechanism, the public keys are generated by a trusted center, which would then distribute them remotely over a secure channel to the users in the system. The second mechanism is for a sender to generate the public key locally for every recipient. In this way, the trusted center is not required to first generate a private key for every recipient and then distribute these generated public keys remotely over a secure channel to every sender.

Generating public keys locally is superior to relying on a trusted center to provide the public keys. When the public encryption keys are generated locally, the latency of encryption is reduced in that it is no longer necessary to retrieve a certificate from a remote server.

Traditionally in the PKC, public keys are generated by a trusted center (certificate authority) guaranteeing that a public key belongs to a certain recipient. The certificate authority is a trustworthy entity that distributes the certificates throughout the PKC. In a typical PKC, the trusted center is operable to produce an X.509 certificate that includes the public key for a recipient as well as other ancillary data. The trusted center then digitally signs the provided certificate, in order for the sender to verify the authenticity of the provided certificate and the corresponding public key. Nevertheless, distributing and managing the public key certificates in a large system is a challenging task, as the certificates have to be protected from tampering over insecure channels during transmission or when received at the sender's local machine.

An alternate approach to public key encryption is to self-generate the public parameters that would be used to encrypt sensitive data using the recipient's known identity, such as a phone number, email address or username. Boneh and Franklin have introduced an Identity-Based Encryption (IBE®) scheme in which the identity of the recipient is used in the encryption, such as described in Dan Boneh and Matthew Franklin, "Identity-Based Encryption from the Weil Pairing" *SIAM Journal of Computing*, 32(3):586-615, 2003 and U.S. Pat. No. 7,113,594, the contents of which are hereby incorporated by reference in their entirety. In their setup, every user is given a private key, but the encryption key is constructed using the identity of the recipient and the trusted center's public key. Their system removes the need to contact the trusted center (certificate authority) to retrieve the public key of a recipient. However in their system, the public key of the trusted center ($P_{pub}$) has to be strictly protected. If a different public key is used in the encryption by mistake or fraud, the security of the encryption is entirely compromised.

It should be noted that the entire security of their scheme relies on the security of the public key of the trusted center, which is publicly known and therefore widely available. If an adversary can change the public parameter(s) of the trusted center either by accessing the local storage of trusted center's public key or by sending a different public key via a man-in-the-middle attack, the security of the encryption system is compromised.

SUMMARY OF THE INVENTION

The present invention is directed to provide an improved certificate-less authenticated encryption (CLAE) method and an authentication system using identity-based encryption.

It is an object of the present invention to configure a PKC system which has eliminated the need for distributing and managing public keys throughout the system. Instead, the public keys are generated and verified locally. Once the system is initialized, any entity in the system can self-generate the public key of any other entities and encrypt sensitive data by using the recipient's identity, such as a phone number, email address or username. Only the true recipient is then able to decrypt and retrieve the sensitive data using a private key known only to the recipient and obtained from a trusted center.

One of the many security challenges in the PKC systems is protecting the public key certificates from tampering and securely distributing them throughout the system. Boneh and Franklin, as discussed above, proposed an IBE® scheme in which the public identity of users is used to generate the encryption keys. However, the same problems occur with the public key of the trusted center (i.e. the "key generator", according to Boneh and Franklin). If $P_{pub}$ and P are replaced fraudulently, the fraudster can easily access the encrypted messages. This attack is possible since $P_{pub}$ and P in the Boneh and Franklin setup are publicly known and widely available. Therefore, the public keys are not protected at all or they are less protected throughout the system than the private keys or the secret master key. Furthermore, the public parameters are broadcast throughout the system via a public, insecure channel. Therefore, an adversary may try to change the values of $P_{pub}$ and P in the encryption algorithm.

As described in the prior art, if a fraudster substitutes $P_{pub}$ with any other point, such as xP where x is known to the fraudster, the adversary can easily find $g_{ID}{}^r$ (i.e. the "session key", according to Boneh and Franklin) and reverse the encryption of M. This is further shown as follows: as described by Boneh and Franklin, discussed above, we have $g_{ID} = e(Q_{ID}, P_{pub})$, which under the fraudster's modification would become $g'_{ID} = e(Q_{ID}, xP)$. The corresponding message key would be $g\, g_{ID}{}'^r$, where it can be easily found from V=rP in the Voltage Security IBE®. This is performed in IBE® by computing:

$$e(Q_{ID}, V)^x = e(Q_{ID}, rP)^x = e(Q_{ID}, xp)^r = g_{ID}{}'^r$$

In contrast, the CLAE scheme according to the present invention allows the sender to locally verify the public keys (i.e. $P_{pub}$) of the server before encrypting the message. In other words, the sender is operable to verify the trusted center (TC) before encrypting a message, thereby ensuring that the public parameters have not been modified. The point of trust in the CLAE scheme of the present invention is established from the public identity of the server (e.g. "abc.com") and, unlike the prior art, it is not a fixed parameter that can be altered.

In one aspect of the present invention, a new CLAE framework has been designed that uses the identity of the recipient to remove the need for public key certificates. Instead of using a predetermined parameter to generate the public/private encryption key, the user incorporates the identity of the trusted center as well as the identity of the recipient. In this manner, greater flexibility is provided in generating the encryption keys, as the user can arbitrarily choose any trusted center using its own identity and can be assured that its selection will be enforced on the recipient. For instance, the user might want to send an encrypted email from an "abc.com" account to someone with an "xyz.com" account. In this case, the user can choose either "abc.com" or "xyz.com" as the trusted center simply by using the trusted center's identity in the encryption process. The recipient is then forced to verify itself to the trusted center chosen by the sender. Such a system may also allow the sender of an encrypted message to verify one or more of the public parameters to ensure that they have not been tampered with.

In one aspect, the present invention resides in a method of sending an encrypted message by a sender having a sender identity string ($Id_{sender}$) to a recipient over a network using identity-based encryption, the method may include identifying a trusted center (TC) by a TC identity string ($Id_{TC}$), the trusted center having an identity-based public encryption key of the trusted center ($g_{pub}$) based on the TC identity string ($Id_{TC}$). Furthermore, the method may include determining if the sender has a sender private key ($Prv_{sender}$) and a plurality of public parameters (PK) for the chosen trusted center (TC), the public parameters (PK) including the identity-based public encryption key of the trusted center ($g_{pub}$) and a bilinear map (e). Furthermore, the method may include verifying the public parameters (PK) of the trusted center (TC) using the TC identity string ($Id_{TC}$) prior to encrypting a plaintext message (M). Furthermore, the method may include identifying the recipient by a recipient identity string ($Id_{recipient}$), the recipient having an identity-based public encryption key of the recipient ($g_{recipient}$) for the trusted center (TC) based on the recipient identity string ($Id_{recipient}$) Furthermore, the method may include generating the identity-based public encryption key of the recipient ($g_{recipient}$) using the public parameters (PK) and the recipient identity string ($Id_{recipient}$) Furthermore, the method may include encrypting the plaintext message (M) as ciphertext (C) using the public parameters (PK), a random symmetric key ($\sigma$) and the identity-based public encryption key of the recipient ($g_{recipient}$), the ciphertext (C) including the encrypted message. Finally, the method may include transmitting the ciphertext (C) to the recipient over the network.

In another aspect, the present invention resides in a method for using certificate-less authenticated encryption (CLAE) using identity-based encryption in a network system between a sender having a sender identity string ($Id_{sender}$) and a recipient having a recipient identity string ($Id_{recipient}$), the method may include at the sender: identifying a trusted center (TC) by a TC identity string ($Id_{TC}$), the trusted center having an identity-based public encryption key of the trusted center ($g_{pub}$) based on the TC identity string ($Id_{TC}$); determining if the sender has a sender private key ($Prv_{sender}$) and a plurality of public parameters (PK) for the trusted center (TC), the public parameters (PK) including the identity-based public encryption key of the trusted center ($g_{pub}$) and a bilinear map (e); verifying the public parameters (PK) of the trusted center (TC) using the TC identity string ($Id_{TC}$) prior to encrypting a plaintext message (M); identifying the recipient by a recipient identity string ($Id_{recipient}$), the recipient having an identity-based public encryption key of the recipient ($g_{recipient}$) for the trusted center (TC) based on the recipient identity string ($Id_{recipient}$); generating the identity-based public encryption key of the recipient ($g_{recipient}$) using the public parameters (PK) and the recipient identity string ($Id_{recipient}$); encrypting the plaintext message (M) as ciphertext (C) using the public parameters (PK), a random symmetric key ($\sigma$) and the identity-based public encryption key of the recipient ($g_{recipient}$), the ciphertext (C) including the encrypted message; and transmitting the ciphertext (C) to the recipient over the network. Furthermore, the method may include at the recipient: receiving the ciphertext (C) from the sender over the network system; determining if the recipient has a recipient private key ($Prv_{recipient}$) and the public parameters (PK) for the trusted center (TC); decrypting the ciphertext (C) to obtain the plaintext message (M) using the public parameters (PK), and the recipient private key ($Prv_{recipient}$).

In another aspect, the present invention resides in a method of verifying a plurality of public parameters (PK) from a trusted center (TC) in an identity-based encryption system prior to encrypting a plaintext message (M) by a sender having a sender identity string ($Id_{sender}$) The method may include identifying the trusted center (TC) by a TC identity string ($Id_{TC}$), the trusted center having an identity-based public encryption key of the trusted center ($g_{pub}$) based on the TC identity string ($Id_{TC}$). Furthermore, the method may include determining if the sender has a sender private key ($Prv_{sender}$) and the plurality of public parameters (PK) for the trusted center (TC), the public parameters (PK) including the identity-based public encryption key of the trusted center ($g_{pub}$) and a bilinear map (e). Finally, the method may include verifying the public parameters (PK) of the trusted center (TC) using the TC identity string ($Id_{TC}$) prior to encrypting the plaintext message (M) by comparing values of the bilinear map (e) calculated with variables comprising the sender private key ($Prv_{sender}$) and the identity-based public encryption key of the trusted center ($g_{pub}$).

In another aspect, the present invention resides in a system for sending an encrypted message over a network using identity-based encryption. The system may include: a trusted center (TC) having a TC identity string ($Id_{TC}$), a sender having a sender identity string ($Id_{sender}$), and a recipient having a recipient identity string ($Id_{recipient}$). The trusted center (TC) may include a first memory and one or more processors configured for: generating a plurality of public parameters (PK) and a secret master key (s) from a security parameter ($\lambda$), the public parameters (PK) including a bilinear map (e) and an identity-based public encryption key of the trusted center ($g_{pub}$) based on the TC identity string ($Id_{TC}$); receiving a request from a requestor; if the request from the requestor contains an identifier (Id) identifying the requestor, generating a private key ($Prv_{Id}$) based on the identifier (Id) and the secret master key (s); and transmitting the private key ($Prv_{Id}$) to the requestor over the network system; and if the request from the requestor includes a request for the public parameters (PK), and transmitting the public parameters (PK) to the requestor over the network system. The sender may include a second memory and one or more processors configured for: identifying the trusted center (TC) by the TC identity string ($Id_{TC}$), determining if the sender has a sender private key ($Prv_{sender}$) and the public parameters (PK) for the trusted center (TC), verifying the public parameters (PK) of the trusted center (TC) using the TC identity string ($Id_{TC}$) prior to encrypting a plaintext message (M); identifying the recipient by the recipient identity string ($Id_{recipient}$), the recipient having an identity-based public encryption key of the recipient ($g_{recipient}$) for the trusted center (TC) based on the recipient identity string ($Id_{recipient}$); generating the identity-based public encryption key of the recipient ($g_{recipient}$) using the public parameters (PK) and the recipient identity string ($Id_{recipient}$); encrypting the plaintext message (M) as ciphertext (C) using the public parameters (PK), a random symmetric key ($\sigma$) and the identity-based public encryption key of the recipient ($g_{recipient}$), the ciphertext (C) including the encrypted message; and transmitting the ciphertext (C) to the recipient over the network. The recipient may include a third memory and one or more processors configured for: receiving the ciphertext (C) from the sender over the network system; determining if the recipient has a recipient private key ($Prv_{recipient}$) and the public parameters (PK) for the trusted center (TC); decrypting the ciphertext (C) to obtain the plaintext message (M) using the public parameters (PK), and the recipient private key ($Prv_{recipient}$).

In another aspect, the present invention resides in a computer program product comprising a computer readable memory storing computer executable instructions thereon that, when executed by a computer, perform the method of: identifying a trusted center (TC) by a TC identity string ($Id_{TC}$), the trusted center having an identity-based public encryption key of the trusted center ($g_{pub}$) based on the TC identity string ($Id_{TC}$); determining if a sender has a sender private key ($Prv_{sender}$) and a plurality of public parameters (PK) for the trusted center (TC), the public parameters (PK) including the identity-based public encryption key of the trusted center ($g_{pub}$) and a bilinear map (e); verifying the public parameters (PK) of the trusted center (TC) using the TC identity string ($Id_{TC}$) prior to encrypting a plaintext message (M); identifying a recipient by a recipient identity string ($Id_{recipient}$), the recipient having an identity-based public encryption key of the recipient ($g_{recipient}$) for the trusted center (TC) based on the recipient identity string ($Id_{recipient}$); generating the identity-based public encryption key of the recipient ($g_{recipient}$) using the public parameters (PK) and the recipient identity string ($Id_{recipient}$); encrypting the plaintext message (M) as ciphertext (C) using the public parameters (PK), a random symmetric key ($\sigma$) and the identity-based public encryption key of the recipient ($g_{recipient}$), the ciphertext (C) including an encrypted message based on the plaintext message (M); and transmitting the ciphertext (C) to the recipient over a network.

Further and other features of the invention will be apparent to those skilled in the art from the following detailed description of the embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
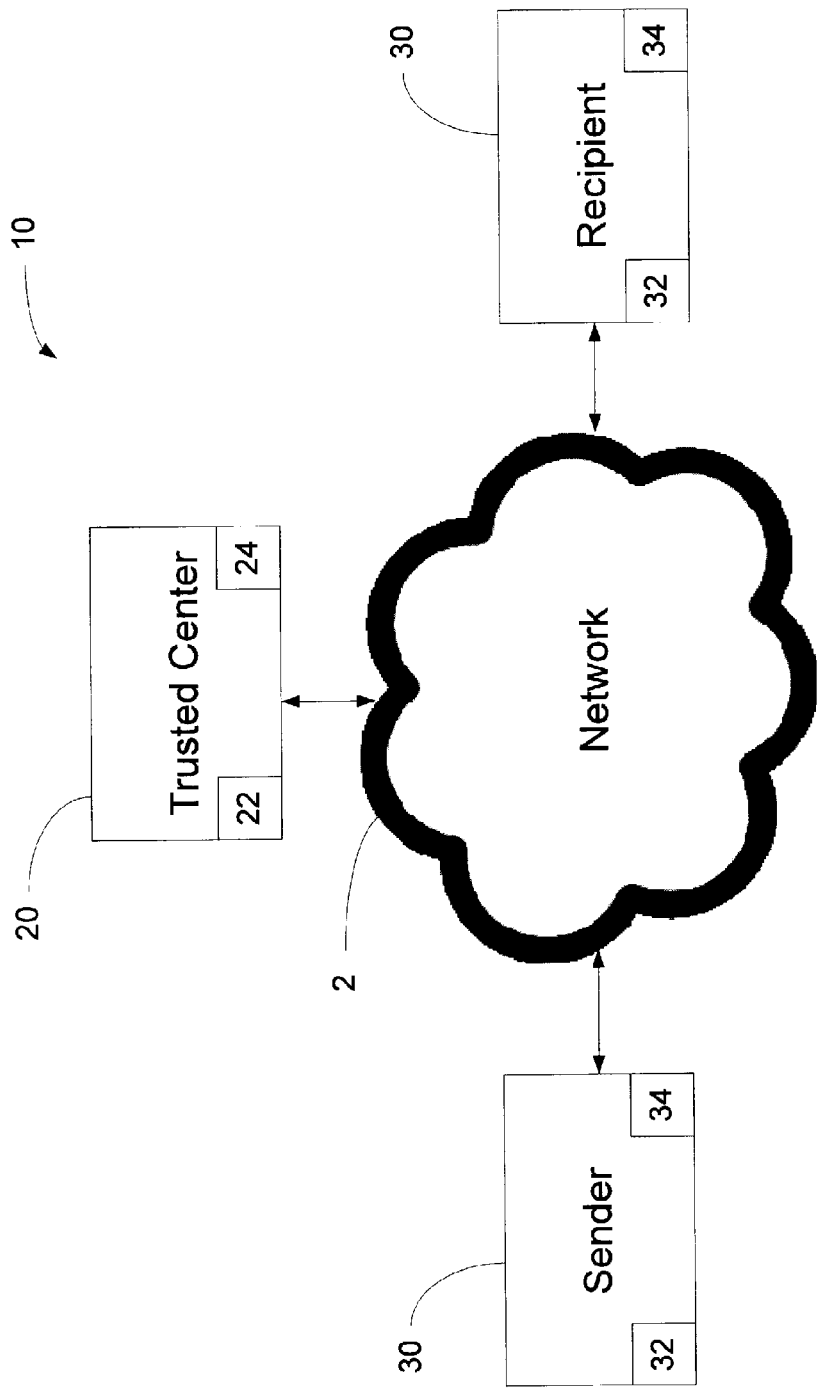
FIG. 1 shows a network system in accordance with an embodiment of the present invention.

A network system 10 in accordance with an embodiment of the present invention is shown in FIG. 1. The network system 10 includes a trusted center 20, a user 30 labeled as "Sender" and a user 30 labeled as "Recipient" connected over a network 2, such as an intranet, the interne, and the like. While the two users 30 may be labeled differently, it should be understood that the labels are arbitrary and may change based on the direction an encrypted message is being sent. A "Sender" is a user 30 operable to package a plaintext message as an encrypted message for transmission and a "Recipient" is a user 30 operable to receive the encrypted message from the "Sender". Upon a response to an encrypted message, the "Recipient" may become the "Sender", and vice versa.

Each of the users 30 labeled "Sender" and "Recipient" are configured with a memory 32 and one or more processors 34. It should be understood that any additional hardware as known to those skilled in the art may be included, such as dedicated circuits, a field programmable gate array (FPGA), and the like. Each of the users 30 may exist on separate computers and/or mobile devices incorporating the necessary operating system, software and/or browsers as known to those skilled in the art.

Similarly, the trusted center 20 may exist as a dedicated server or as part of a distributed network having memory 22 and one or more processors 24. The trusted center 20 may also include additional hardware and software components as known the art, such as firewalls and associated security mechanisms. The trusted center 20 is connected to the "Sender" and "Recipient" over network 2.

In operation, the network system 10 in accordance with the present invention is operable to transmit information from the "Sender" to the "Recipient" using a certificate-less authenticated encryption (CLAE) scheme. Each of the users 30 is operable to communicate with the trusted center 20 to obtain a respective private key (Prv) and a plurality of public parameters (PK). The public parameters (PK) are specific to the trusted center, which includes an identity-based public encryption key of the trusted center ($g_{pub}$). Once these parameters (i.e. Prv and PK) have been obtained by the respective "Sender" and "Recipient", the sender and recipient are operable to communicate independent of the trusted center 20 over a secure channel by encrypting the message using the recipient's public key, which is generated locally by the sender using the public parameters (PK) obtained from the trusted center (TC) and a recipient identity string ($Id_{recipient}$) associated with the recipient. Furthermore, prior to encrypting a message, the sender is operable to verify the public parameters (PK) of the trusted center (TC) using the trusted center identity string ($Id_{TC}$), which is known to the sender, to ensure that the public parameters (PK) have not been modified.

Figure 2:
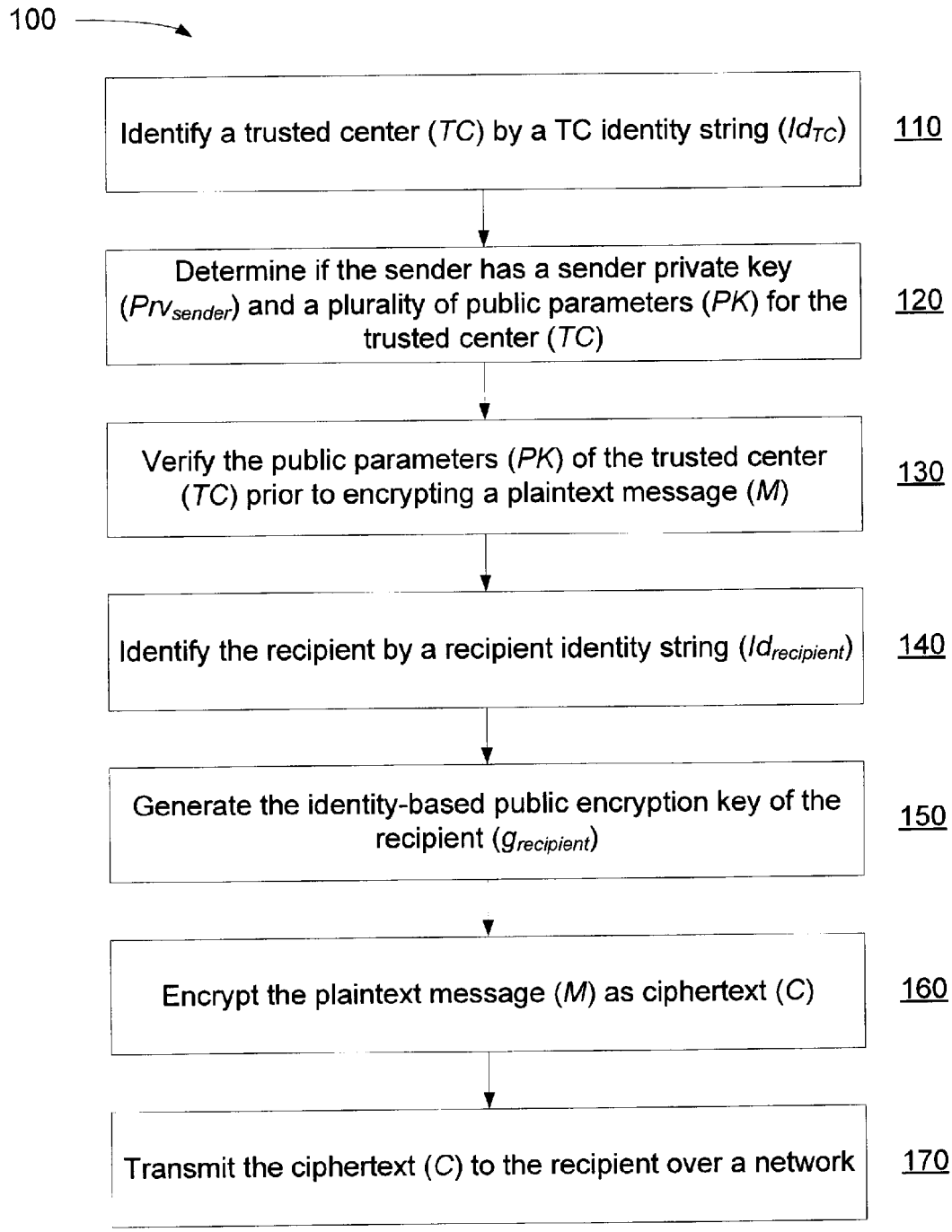
FIG. 2 shows a flowchart illustrating a method for sending an encrypted message in accordance with an embodiment of the present invention.

The CLAE scheme is based on identity-based encryption (IBE®) and, as shown in the flowchart 100 of a preferred embodiment as seen in FIG. 2, generally operates as follows:

a. In step 110, the user 30 (i.e. "Sender") identifies a trusted center (TC) by a TC identity string ($Id_{TC}$, i.e. "xyz.com" or "name of TC").

b. In step 120, the "Sender" determines if it has a sender private key ($Prv_{sender}$) and a plurality of public parameters (PK) associated with or generated by the trusted center (TC).

c. In step 130, the "Sender" verifies the public parameters (PK) of the trusted center (TC) prior to encrypting a plaintext message (M). The verification process relies on the properties of the public parameters (PK) and sender private key ($Prv_{sender}$), both generated by the trusted center (TC), and the known TC identity string ($Id_{TC}$) and the sender identity string ($Id_{sender}$). In particular, the verification process relies on the mathematical properties of the bilinear map (e), which forms part of the public parameters, as further discussed below.

d. In step 140, the "Sender" identifies the user 30 (i.e. "Recipient") to receive the plaintext message (M) by a recipient identity string ($Id_{recipient}$). The recipient identity string may be an email address, a phone number, a name, and the like.

e. In step 150, the "Sender" generates the identity-based public encryption key of the recipient ($g_{recipient}$) using the public parameters (PK) and the recipient identity string ($Id_{recipient}$). In this manner, communication with the trusted center (TC) is not required and a certificate issued by the trusted center (TC) is not necessary to authenticate the recipient's public key ($g_{recipient}$) Generating the recipient's public key ($g_{recipient}$) locally also allows for offline encryption.

f. In step 160, the "Sender" encrypts the plaintext message (M) as ciphertext (C). The ciphertext (C) includes the encrypted message, as well as ancillary information necessary for decrypting the message. Additional authentication information may also be appended to the ciphertext (C).

g. In step 170, the "Sender" transmits the ciphertext (C) to the "Recipient" over the network 2. As the message is encrypted, the message may be sent over an unsecured channel. A user will require the recipient private key ($Prv_{recipient}$) and the public parameters for the trusted center (PK) to read the plaintext message (M).

In this manner, the "Sender" is able to send a plaintext message (M) as an encrypted message to the "Recipient" without accessing the trusted center (TC), as long as the "Sender" has the required public parameters (PK) and its own sender private key ($Prv_{sender}$). Furthermore, with the public parameters (PK) and its own sender private key ($Prv_{sender}$), the "Sender" is able to verify that the public parameters (PK) have not been compromised. In this manner, the "Sender" is operable to ensure that only the "Recipient" having the recipient private key ($Prv_{recipient}$) will be able to decrypt the ciphertext (C).

To implement the CLAE scheme, and the method of the preferred embodiment discussed above, four major algorithms are utilized. It should be understood that additional algorithms, application programming interfaces (APIs), methods, and/or functions will be known and/or implemented by those skilled in the art to provide common functions and operations necessary to implement the network system according to the present invention. The four major algorithms in accordance with a preferred embodiment include:

Setup ($\lambda$): This algorithm is run by the trusted center 20 (i.e. system administrator) which provides the encryption/decryption services. It takes as inputs the security parameter ($\lambda$) and outputs the public parameters (PK) of the CLAE and the secret master key (s) of the administrator (e.g. with the identity string "admin") as the trusted center (TC).

KeyGen (Id, s): This algorithm is also run by the trusted center 20 (i.e. administrator) which distributes the private keys (Prv) throughout the system. It takes as inputs an identity string (Id), which may be received from a user 30, and the secret master key (s) from the administrator. It outputs a private key ($Prv_{Id}$) that will be used for decryption in the Auth-Decrypt( ) algorithm, but which may also be incorporated into the Verifi-Encrypt( ) algorithm to allow for the authentication of a sent message. While the KeyGen( ) algorithm is run by the trusted center 20, it may be run on behalf of a user 30 which has provided its identity string (Id) to the trusted center (TC).

Verifi-Encrypt (Id, PK, M): This algorithm is run independently by individual users 30 who wish to encrypt sensitive data (i.e. the "Sender"). It takes as inputs the identity string of the recipient (Id, or more specifically, $Id_{recipient}$), the set of public parameters (PK) and the plaintext message (M). The algorithm first verifies whether the public parameters (PK) are genuine under the given administrative network for the specific trusted center 20 and then outputs the ciphertext message (C) where C=⟨V,U,W,Y⟩ and where V, U, and W are parameters that are necessary to decrypt and recover the plaintext message M, and Y is a parameter which may be used by the recipient to authenticate the sender.

Auth-Decrypt ($Prv_{Id}$, PK, C): This algorithm is run independently by individual users 30 who are recipients of the ciphertext (C) and wish to decrypt and access the plaintext message (M) from the ciphertext (C). The algorithm takes as inputs the private key of the recipient ($Prv_{id}$, or more specifically, $Prv_{recipient}$), the public parameters (PK) and the ciphertext message (C). If the recipient has the proper private key ($Prv_{Id}$) under the same administrative network associated with identity string of the recipient (Id), the algorithm outputs the plaintext message (M).

The internal structure of each of the four-mentioned algorithms in accordance with a preferred embodiment will be further discussed below, including the mathematical basis which may provide the functionality of the mentioned algorithms.

Bilinear Pairings

The CLAE scheme is based on Bilinear pairings. A bilinear pairing is formally defined as follows:

Let G and $G_T$ be groups of order p, and let g be a generator of G. A bilinear map is an efficiently computable function from G×G onto $G_T$, such that it has the following properties:

1. Bilinearity: for all g, g', h, h'∈G, $$e: G \times G \to G_T,$$

$$e(gg',h)=e(g,h)e(g',h),$$

$$e(g,hh')=e(g,h)e(g,h')$$

Note: that e(•,•) is symmetric, that is $e(g^a,g^b)=e(g^b,g^a)=e(g,g)^{ab} \forall a,b$.

2. Non-degeneracy: If e(g,h)=1 for all h∈G, then g=I (identity).

Weil pairing and Tate pairing are two implementations of an efficient bilinear map over elliptic curve groups useful for cryptography, such as described in Ian F. Blake, Gadiel Seroussi, and Nigel P. Smart, editors, Advances in Elliptic Curve Cryptography, Cambridge University Press, 2005, the contents of which are herein incorporated by reference in its entirety. Cryptographic bilinear maps must have certain complexity properties that are explained in the following section.

Complexity Assumptions

In general, cryptographic bilinear maps need to be one-way functions, i.e. computing the bilinear pairing should be efficient, but the inverse has to be difficult. The Bilinear Diffie-Hellman (BDH) complexity assumption is related to the difficulty of solving Discrete Logarithm Problem (DLP) over large algebraic groups.

Definition 1 (BDH Assumption):

Let G and $G_T$ be groups of order p with a bilinear map $e: G \times G \to G_T$, where g is a generator for G and $$a, b, c \xleftarrow{R} Z^*_p.$$

Given $\{g^a, g^b, g^c\}$, computing $e(g,g)^{abc} \in G_T$, without knowing a, b or c is difficult.

Informally, the decision variant of the BDH assumption states that the probability of correctly distinguishing $e(g,g)^{abc} \in G_T$ from a random choice $R \in G_T$ is negligible $\epsilon$. A function g:R→R is negligible if for any d>0 we have g(λ)<1/$\lambda^d$ for sufficiently large λ. Formal definitions proceeds below.

Decision BDH Assumption:

Suppose that a challenger chooses a,b,c,z∈$Z^*_p$ at random. g is generator for the group G over which the bilinear mapping e(•,•) is defined. Decision BDH assumption states that no polynomial-time adversary can distinguish the tuple ⟨A=$g^a$, B=$g^b$,C=$g^c$,Z=$e(g,g)^{abc}$⟩ from the tuple ⟨A=$g^a$,B=$g^b$,C=$g^c$, Z=$e(g,g)^z$⟩ with a non-negligible probability.

This is a standard assumption in cryptography and provides a foundation for the proof of security for the main scheme.

Certificate-Less Authenticated Encryption

The details of the main algorithms in the CLAE scheme in a preferred embodiment of the present invention, using the bilinear mapping and assumptions provided above, are given as follows:

Setup(λ): It takes as inputs the security parameter λ, and then generates the groups G and $G_T$ of a prime order p and a bilinear map e. The size of the groups is determined by λ. Let's denote the identity string of the trusted center by "admin"—note that any other string representing the trusted center, e.g. "abc.com" or "xyz.com" could be used. Select a symmetric key encryption function $\epsilon$ in which the shared key is n-bit long. We denote the decryption function corresponding to $\epsilon$ by D, and it should be clear that by knowing $\epsilon$ it would be easy to find D. Choose three cryptographic hash functions $H_1$, $H_2$ and $H_3$, such that $H_1: \{0,1\}^* \to G$, $H_2: G_T \to \{0,1\}^n$, and $H_3: \{0,1\}^n \times \{0,1\}^n \to Z^*_p$. Pick at random $$s \xleftarrow{R} Z^*_p$$

and set $g_{admin}=H_1("admin") \in G$. Compute $g_{pub}=g_{admin}^s$ as the trusted center's public key. Let's denote the public parameters of the CLAE by public parameters (PK) that includes a description of ⟨G,$G_T$,e,$g_{pub}$,$H_1$,$H_2$,$H_3$,$\epsilon$⟩. Set s as the secret master key, which is only known to the trusted center. Output PK and s.

KeyGen(Id, s): It takes as inputs an identity string of a user (Id) and the secret master key (s) of the administrator. It computes $g_{id}=H_1(Id) \in G$ and sets the private key of the user as $Prv_{id}=g_{Id}^{1/s}$. It then outputs $Prv_{Id}$, along with the public parameters (PK) and privately shares it with the user, for example, over a secure channel. The private key of the user ($Prv_{Id}$) may also be shared with the user by other secure mechanisms, for example, over short message service (SMS) of a mobile device, in person, via a piece of paper which is later discarded, and the like. Although the private key ($Prv_{Id}$) must be kept secure, the public parameters (PK) are very resilient to attacks and can even be sent over an insecure channel and/or be publicly broadcast.

Verifi-Encrypt(Id, PK, M): It takes as inputs the identity string (Id) of the recipient (i.e. $Id_{recipient}$) and the set of public parameters (PK). The plaintext message M is encrypted as follows: The method first verifies the public parameters (PK) are genuine under the chosen trusted center by comparing $e(\text{Prv}_{sender}, g_{pub})$ with $e(g_{sender}, g_{admin})$. Recall that for correct values of $g_{pub} = g_{admin}^s$ and $\text{Prv}_{sender} = g_{sender}^{1/s}$, we have:

$$e(\text{Prv}_{sender}, g_{pub}) = e(g_{sender}^{1/s}, g_{admin}^s) = e(g_{sender}, g_{admin})$$

If a different trusted center is being used, e.g. "another-admin", the verification process proceeds the same by picking the public key of the trusted center, i.e. $g_{pub}$ for "another-admin", and comparing that $e(\text{Prv}_{sender}, g_{pub}) = e(g_{sender}, g_{another-admin})$. This verification process is an important step in making sure the correct public parameters (PK) are being used in the encryption. It should be noted that the only fixed parameters are the trusted center's public key ($g_{pub}$) and the private key of the sender ($\text{Prv}_{sender}$), which have been obtained from the trusted center (TC). The parameters $g_{sender}$ and $g_{admin}$ are generated locally every time the verification is performed using the public parameters (PK) and the identity strings of the sender and the trusted center ($\text{Id}_{sender}$ and $\text{Id}_{TC}$). If the verification passes, it picks a random symmetric key ($\sigma$) and outputs the encrypted ciphertext (C), where C=(V,U,W,Y), and where V, U, W and Y are computed as follows:

$$V = g_{pub}^r, \text{ where } r = H_3(\sigma, M)$$

$$U = \sigma \oplus H_2(e(g_{Id}^r, g_{admin}))$$

$$W = \epsilon_\sigma(M)$$

$$Y = H_2(e(\text{Prv}_{sender}, g_{Id})^r)$$

It should be noted that, for a sender, the identity string being used (Id) in the above formulas is the identity string of the recipient ($\text{Id}_{recipient}$).

Auth-Decrypt ($\text{Prv}_{Id}$, PK, C): It takes as inputs the private key of the recipient ($\text{Prv}_{Id}$, or more specifically, $\text{Prv}_{recipient}$), the public parameters (PK) and the encrypted ciphertext (C), where C=(V,U,W,Y). If the receiver has the proper private key ($\text{Prv}_{Id}$) under the same trusted domain associated with Id, the algorithm outputs the message M as follows: first calculate $\sigma = U \oplus H_2(e(\text{Prv}_{Id}, V))$, where $\text{Prv}_{Id} = g_{Id}^{1/s}$ and then output $$M = D_\sigma(W)$$

Note that Y is used to authenticate the sender as follows: The recipient uses M and $\sigma$ to retrieve r by computing $r = H_3(\sigma, M)$. Then, the algorithm checks whether or not $Y = H_2(e(g_{sender}, \text{Prv}_{Id})^r)$. If yes, then the sender is authenticated and the encrypted ciphertext (C) originated from the claimed sender. Otherwise, the recipient rejects the sender.

Correctness: It is easy to check that decryption correctly recovers M. Note that $V = g_{pub}^r$, $\text{Prv}_{id} = g_{Id}^{1/s}$ and $g_{pub} = g_{admin}^s$. Therefore, we have $$e(\text{Prv}_{Id}, V) = e(g_{Id}^{1/s}, g_{pub}^r)$$
$$= e(g_{Id}^{1/s}, g_{admin}^{rs})$$
$$= e(g_{Id}^r, g_{admin})$$

Therefore, $U \oplus H_2(e(\text{Prv}_{Id}, V)) = \sigma \oplus H_2(e(g_{Id}^r, g_{sender}^r, g_{admin})) \oplus H_2(e(\text{Prv}_{Id}, V)) = \sigma$, which is then applied to D to decrypt W and retrieve M as required. It is also easy to check that $e(g_{sender}, \text{Prv}_{Id})^r$ returns Y for correct values of r and s as the following:

$$e(g_{sender}, \text{Prv}_{Id})^r = e(g_{sender}, g_{Id}^{1/s})^r$$
$$= e(g_{sender}^{1/s}, g_{Id})^r$$
$$= e(\text{Prv}_{sender}, g_{Id})^r$$

As discussed above, the trusted center 20 is configured to initiate the setup of the certificate-less authenticated encryption (CLAE) system by running the Setup ($\lambda$) algorithm and manage the distribution of private keys (Prv) and public parameters (PK) by responding to KeyGen(Id, s) function calls from different users 30 in the network system 10. The trusted center 20 may itself initiate the Setup ($\lambda$) algorithm upon startup or when the trusted center 20 determines for itself that it is necessary to renew or reset the security of the network system 10 by generating a new secret master key (s) and new public parameters (PK). For example, the Setup ($\lambda$) may be run according to a renewal schedule and the like.

Using the mathematical foundation, described above in a preferred embodiment, users 30 in the network system 10 are able to encrypt and decrypt messages using the CLAE scheme.

Figure 3:
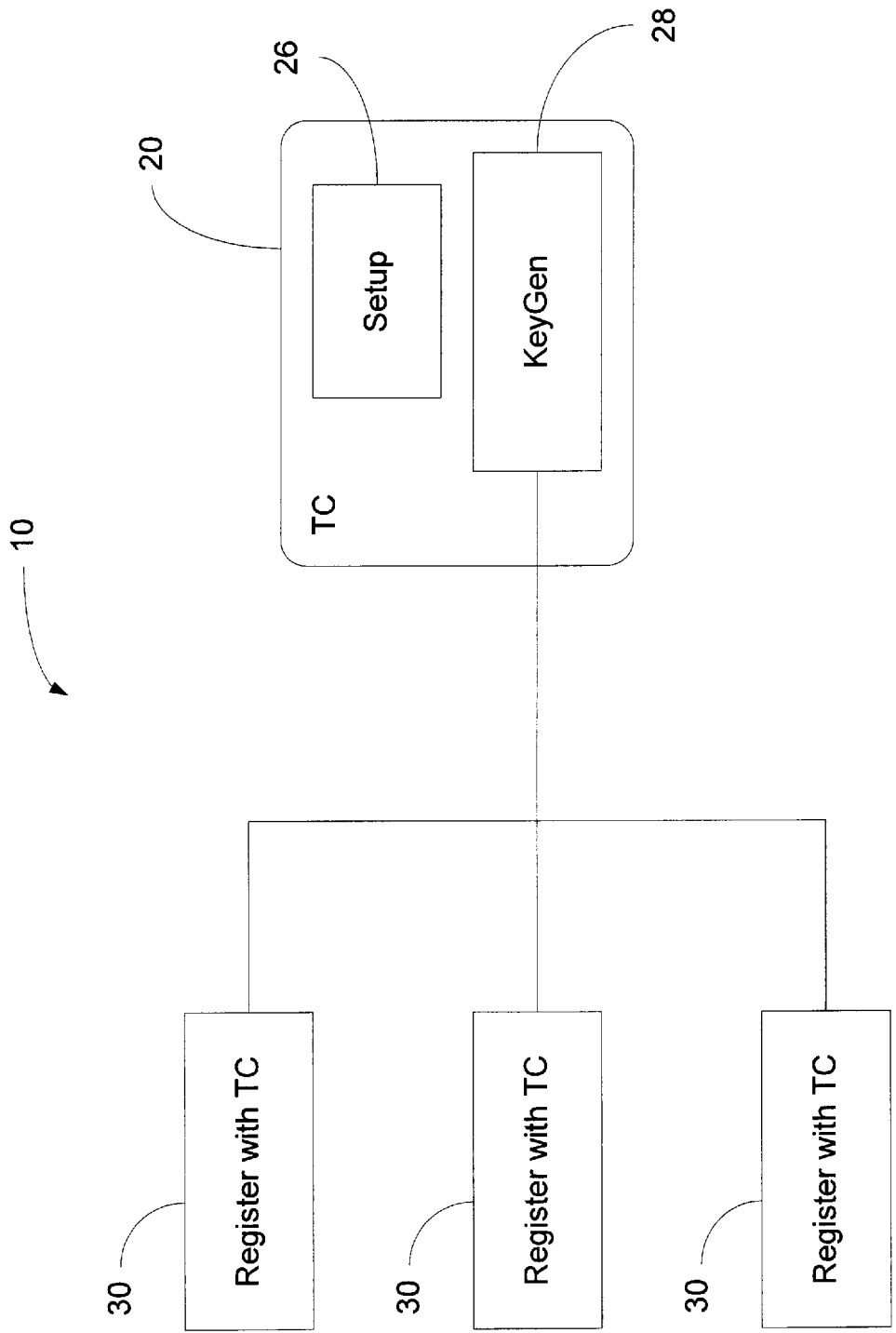
FIG. 3 shows a plurality of users in a network registering with the trusted center in accordance with an embodiment of the present invention.

Turning now to FIG. 3, the different users 30 in the network system 10 are operable to register with the trusted center 20 and obtain the public parameters (PK) and their respective private keys (Prv). For example, the users 30 may call the KeyGen function 28 made available by the trusted center 20.

The trusted center 20 may also provide a Setup function 26 for a user to call. When called, the Setup function 26 may initiate the Setup ($\lambda$) algorithm to renew and/or reset the security of the network system 10 by generating a new secret master key (s) and new public parameters (PK).

Figure 4:
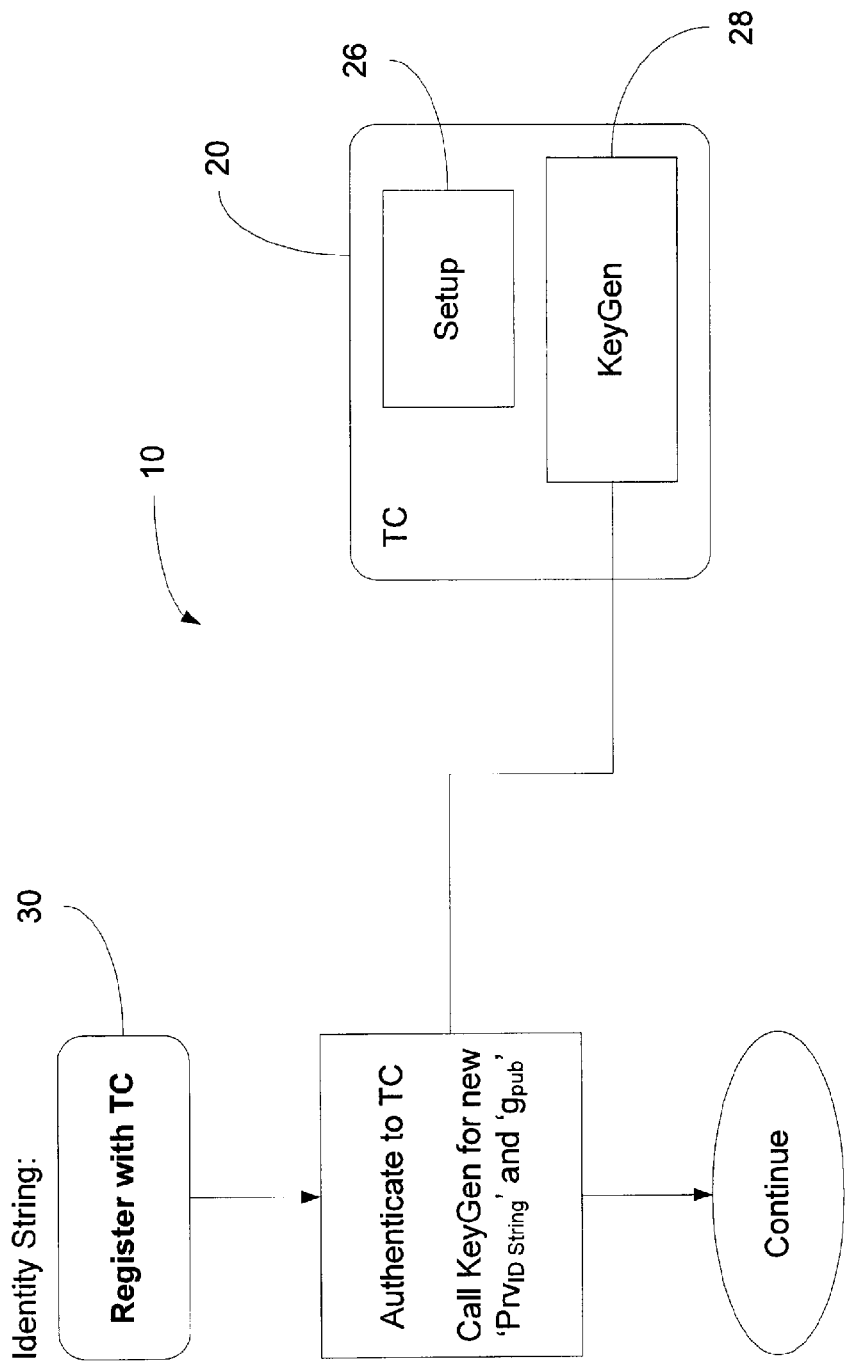
FIG. 4 shows a flowchart for a user labeled "Identity String" registering with the trusted center in accordance with an embodiment of the present invention.

Referring now to FIG. 4, a user 30 is operable to register itself with the trusted center 20 by first authenticating itself with the trusted center 20. Different means for authentication may be used to authenticate a user 30 with the trusted center 20, as known in the art. For example, password-based authentication, a challenge-response protocol such as the Kerberos protocol from the Massachusetts Institute of Technology, biometric authentication (i.e. fingerprint, retinal), and the like may be used. Once the user 30 has authenticated itself, the user 30 is operable to call the KeyGen function 28 provided by the trusted center 20 and submitting its identity string (Id) to the trusted center (TC). In FIG. 4, the user 30 is labeled as "Identity String" (i.e. "ID String"). The trusted center (TC) then calls the KeyGen (Id, s) algorithm using the identity string (Id) provided by the user 30 and its own secret master key (s). In return, the trusted center 20 receives the private key for the user 30 ($\text{Prv}_{ID\_string}$) which the trusted center 20 then passes on to the user 30. The trusted center 20 may also pass on to the user 30, as part of the KeyGen function 28, the public parameters (PK) that are needed to locally generate the identity-based public encryption key of other users based on their identity strings (Id).

Once the user 30 has its respective private key (Prv) and the public parameters (PK), which includes the identity-based public encryption key of the trusted center ($g_{pub}$), a sender is able to send an encrypted message to a recipient without contacting the trusted center 20. No certificate authority is necessary. Instead, the user 30 is able to locally generate the recipient public key ($g_{recipient}$) using the recipient identity string ($\text{Id}_{recipient}$) known to the user 30 and the public parameters (PK).

Figure 5:
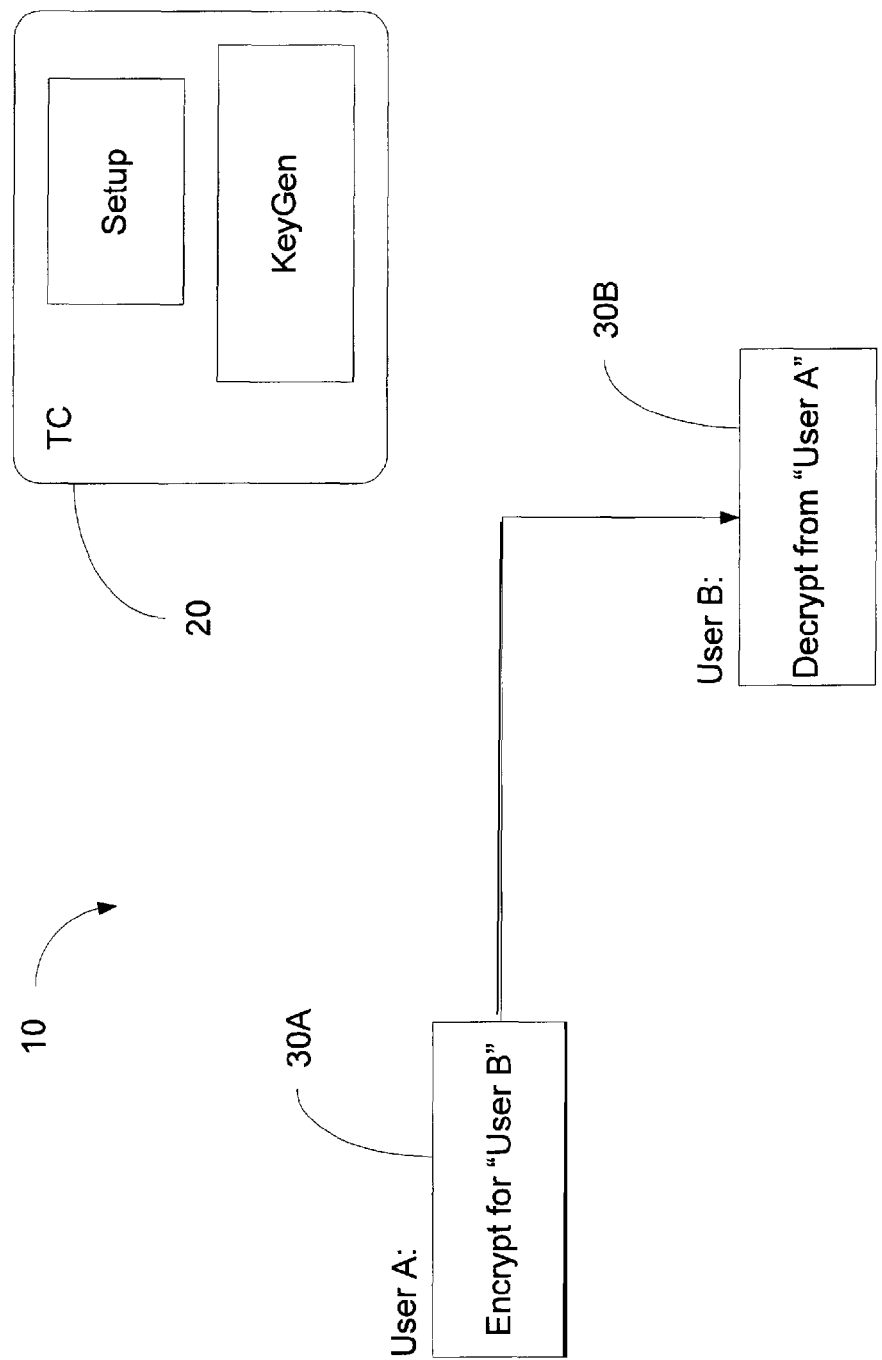
FIG. 5 shows a user labeled "User A" transmitting an encrypted message to a user labeled "User B" in a network with certificate-less authenticated encryption using identity-based encryption in accordance with an embodiment of the present invention.

Referring now to FIG. 5, a transmission from a user 30A labeled "User A" to a user 30B labeled "User B" is shown in a preferred embodiment. The transmission of an encrypted message may be completed without contacting the trusted center 20. Instead, the identity-based public encryption key of the recipient (i.e. $g_{User\ B}$) will be generated locally by the sender (i.e. "User A").

In some embodiments, the CLAE scheme of the present invention may not be efficient for encrypting large files, such as video, audio and other media. In such a situation, it may be desirable to use a conventional symmetric encryption scheme such as the advanced encryption standard (AES), the triple data encryption algorithm (TDEA or 3DES), and the like to transmit the large file. The CLAE scheme of the present invention can then be used to transmit the conventional encryption key ($\Sigma$) of the conventional symmetric encryption scheme as the plaintext message (M), which is to be protected. In this manner, the file transferred may be symmetrically-encrypted using the conventional symmetric encryption scheme, with the conventional encryption key ($\Sigma$) transmitted alongside the encrypted data using the CLAE scheme of the present invention.

Figure 6:
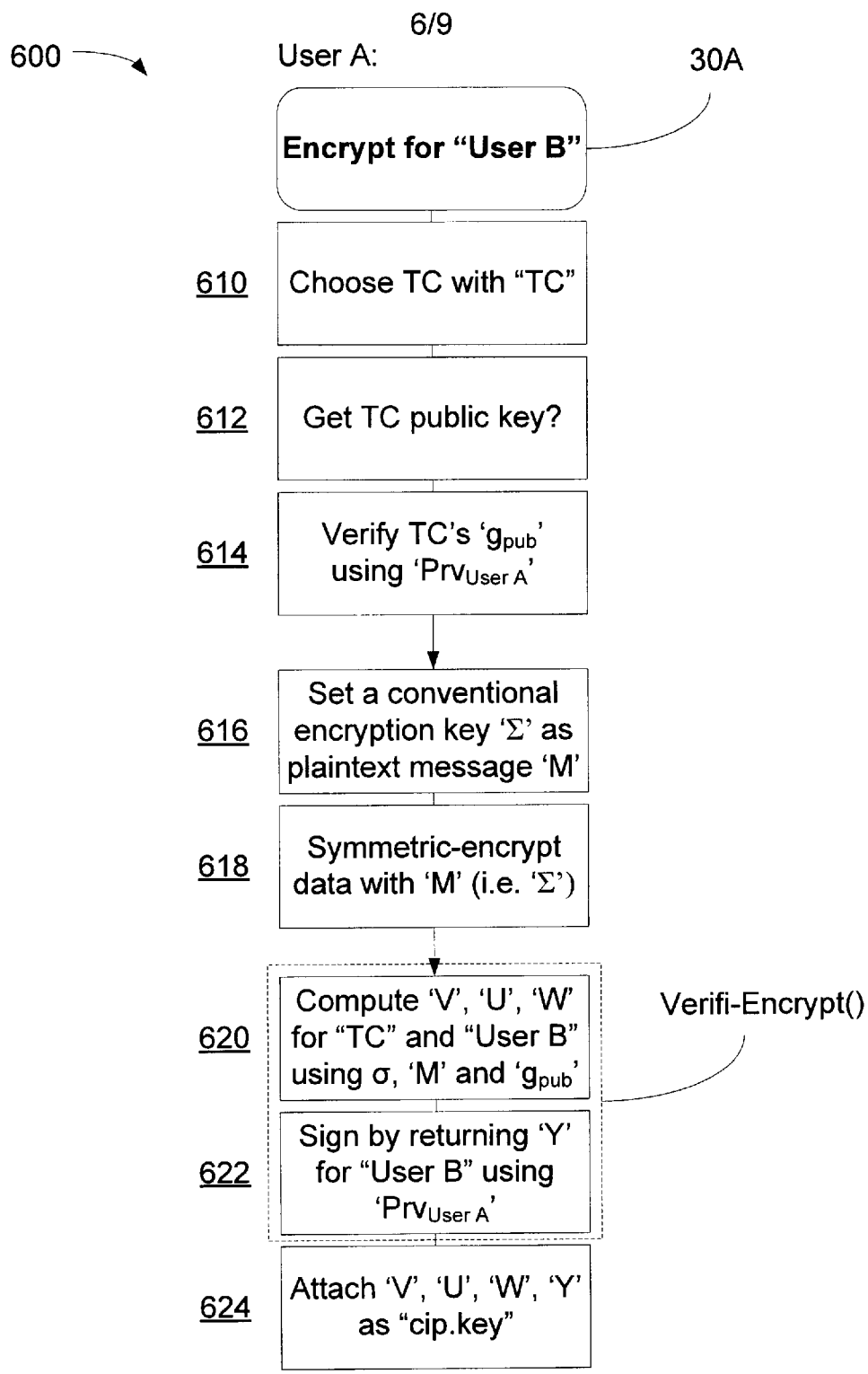
FIG. 6 shows a flowchart for a user labeled "User A" encrypting a message to a user labeled "User B" in accordance with an embodiment of the present invention.

Referring now to FIG. 6, a flowchart 600 is shown illustrating the method used by a user 30A, labeled "User A", for encrypting a message for a user labeled "User B". In step 610, the sender (i.e. user 30A or "User A") identifies or chooses a trusted center (TC) to associate the encrypted message with. The sender identifies the trusted center (TC) by its TC identity string ($Id_{TC}$), i.e. label "TC".

Figure 7:
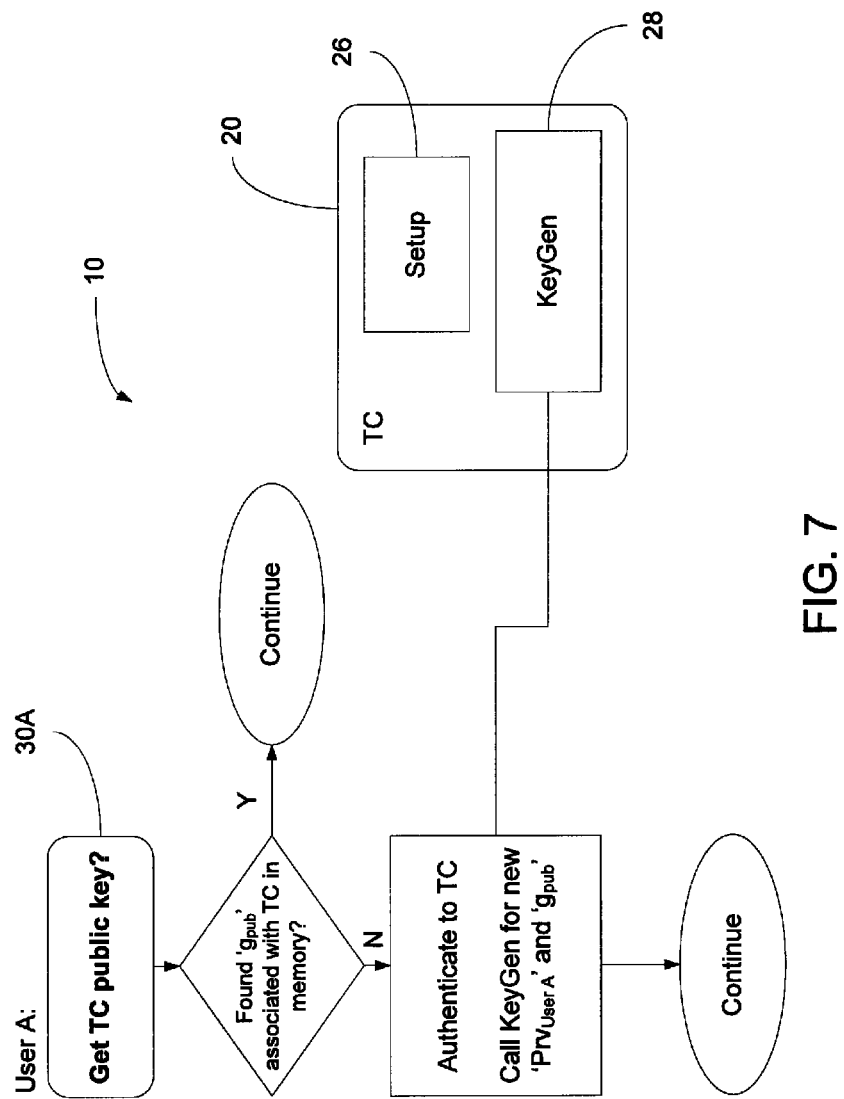
FIG. 7 shows a flowchart for a user labeled "User A" determining whether to get the public key for the trusted center in accordance with an embodiment of the present invention.

Next, in step 612 the sender determines whether it has the plurality of public parameters (PK) for the trusted center (TC), including the identity-based public encryption key of the trusted center ($g_{pub}$) or whether the sender must get the TC's public key prior to proceeding. Referring briefly to FIG. 7, the sender determines whether or not it needs to get the TC's public key by comparing whether any of the $g_{pub}$ the sender may have stored in memory is associated with the identity string of the trusted center ($Id_{TC}$). If not, user 30A authenticates itself with the trusted center 20 and calls the KeyGen function to receive its own private key ($Prv_{User\ A}$) and the trusted center's public parameters (PK), as previously described when registering a new user 30 in FIG. 4.

Returning back to FIG. 6, once the sender believes it has the proper public key $g_{pub}$, the sender in step 614 verifies the TC's public key $g_{pub}$ using the sender's private key ($Prv_{sender}$, or more specifically, $Prv_{User\ A}$), as described above with respect to the Verifi-Enerypt(Id, PK, M) algorithm. In particular, the sender calculates $e(Prv_{sender}, g_{pub})$ and compares it with $e(g_{sender}, g_{admin})$ using the different parameters in the public parameters (PK) associated with the trusted center 20. As noted above, the TC's public key $g_{pub}$ and the sender private key ($Prv_{User\ A}$, i.e. $Prv_{sender}$) are fixed values received and stored by the sender from the trusted center (TC). However, the public keys $g_{sender}$ and $g_{admin}$ are always generated locally using the public parameter (PK) and the sender identity string ($Id_{sender}$, i.e. "User A") and the trusted center identity string ($Id_{TC}$, i.e. "admin"). The sender can be assured that the public parameters (PK) have not been tampered with if $e(Prv_{sender}, g_{pub})=e(g_{sender}, g_{admin})$ is satisfied, as discussed above.

Once the sender has verified the public parameters (PK), the sender can begin by picking a conventional encryption key ($\Sigma$) that is used to encrypt the actual confidential data, such as large documents or video/audio files, using the conventional symmetric encryption scheme (i.e. AES, 3DES and the like). The plaintext message (M) is then set to include the conventional encryption key ($\Sigma$) of the conventional symmetric encryption scheme to be protected by the CLAE Verifi-Encrypt() algorithm, as shown in step 616. Next, as shown in step 618, the confidential data is symmetrically encrypted using the conventional symmetric encryption scheme and the conventional encryption key ($\Sigma$) is stored as (or as a part of) the plaintext message (M).

Next, in step 620, the sender computes each component of the ciphertext (C), as described above with respect to the Verifi-Encrypt(Id, PK, M) algorithm to symmetrically-encrypt the plaintext message (M) using the symmetric key encryption function ($\epsilon$), found within the public parameters (PK), and using a random symmetric key ($\sigma$), generated locally by the sender. In particular, each of V, U and W are computed for the particular trusted center (TC) using the recipient identity string ($Id_{recipient}$, i.e. "User B") associated with the recipient, the random symmetric key ($\sigma$), which is randomly generated every time Verifi-Encrypt(Id, PK, M) is run, and the identity-based public encryption key of the trusted center ($g_{pub}$), as well as the other public parameters in the public parameters (PK).

In step 622, the encrypted message is signed by returning the ciphertext component Y for the recipient using the sender private key ($Prv_{sender}$, or more specifically, $Prv_{User\ A}$). The recipient may be operable to use this ciphertext component Y to authenticate the received message.

Finally, the ciphertext (C) is packaged together in step 624 and is ready to be attached to the transmission to be sent to the recipient. The components of the ciphertext (C) may be packaged as a file (i.e. "cip.key") or within other methods and/or structures known in the art. The symmetrically-encrypted data using the conventional symmetric encryption scheme along with the file, "cip.key", containing the conventional encryption key ($\Sigma$) stored in the plaintext message (M) is then ready for transmission to the recipient and may be sent over an unsecured channel as a properly encrypted message.

Figure 8:
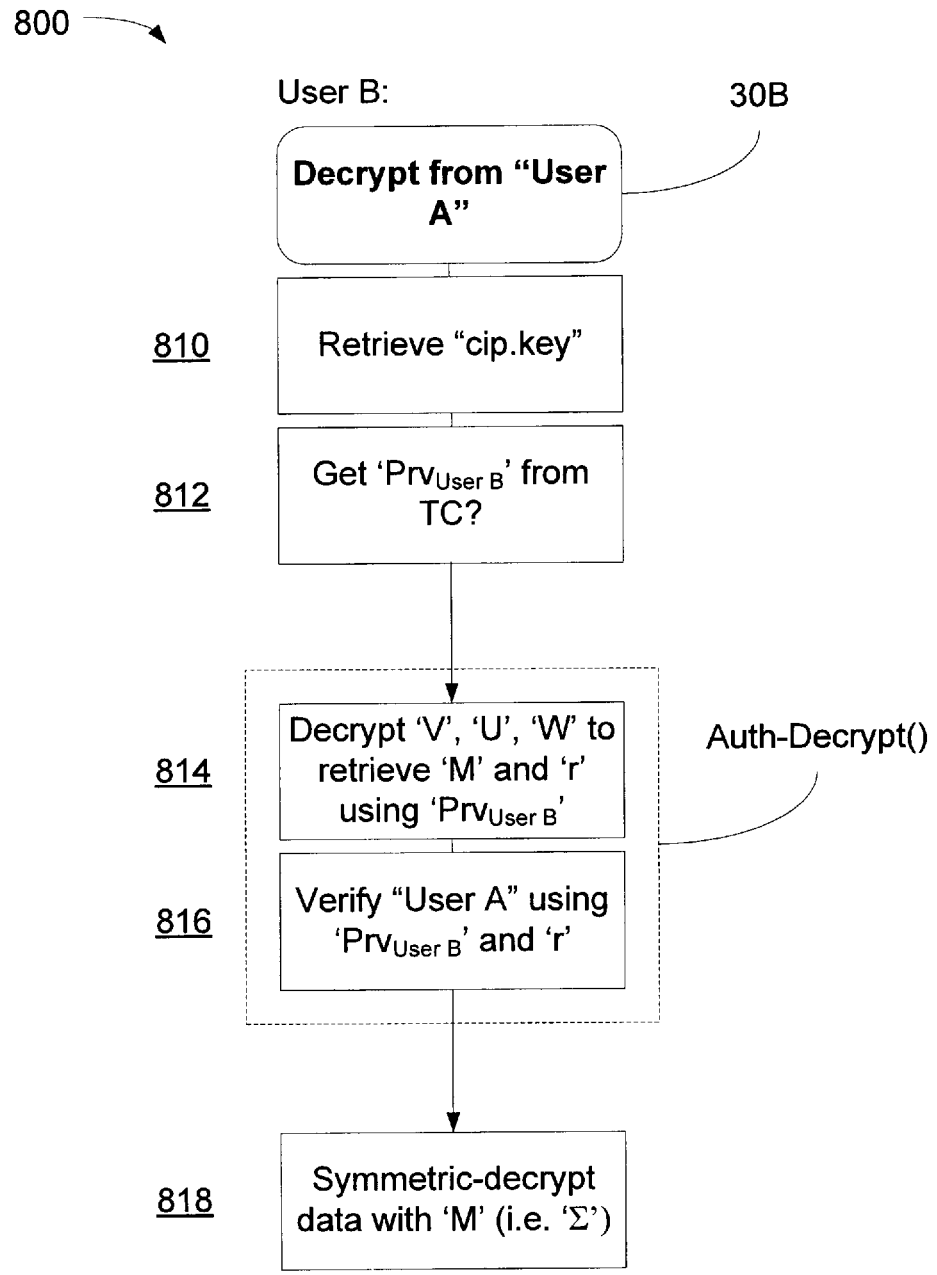
FIG. 8 shows a flowchart for a user labeled "User B" decrypting the message from a user labeled "User A" in accordance with an embodiment of the present invention.

Upon receipt of the ciphertext (C), i.e. as stored in the file "cip.key", the recipient is operable to decrypt the ciphertext (C) to retrieve the plaintext message (M) that contains the conventional encryption key ($\Sigma$) used to encrypt the actual data. Referring now to FIG. 8, a flowchart 800 is shown illustrating a user 30B, labeled "User B", decrypting a message from a user labeled "User A". In step 810, the recipient (i.e. user 30B or "User B") retrieves the ciphertext (C) from the received transmission. For example, the ciphertext (C) may be packaged as the file, "cip.key".

Figure 9:
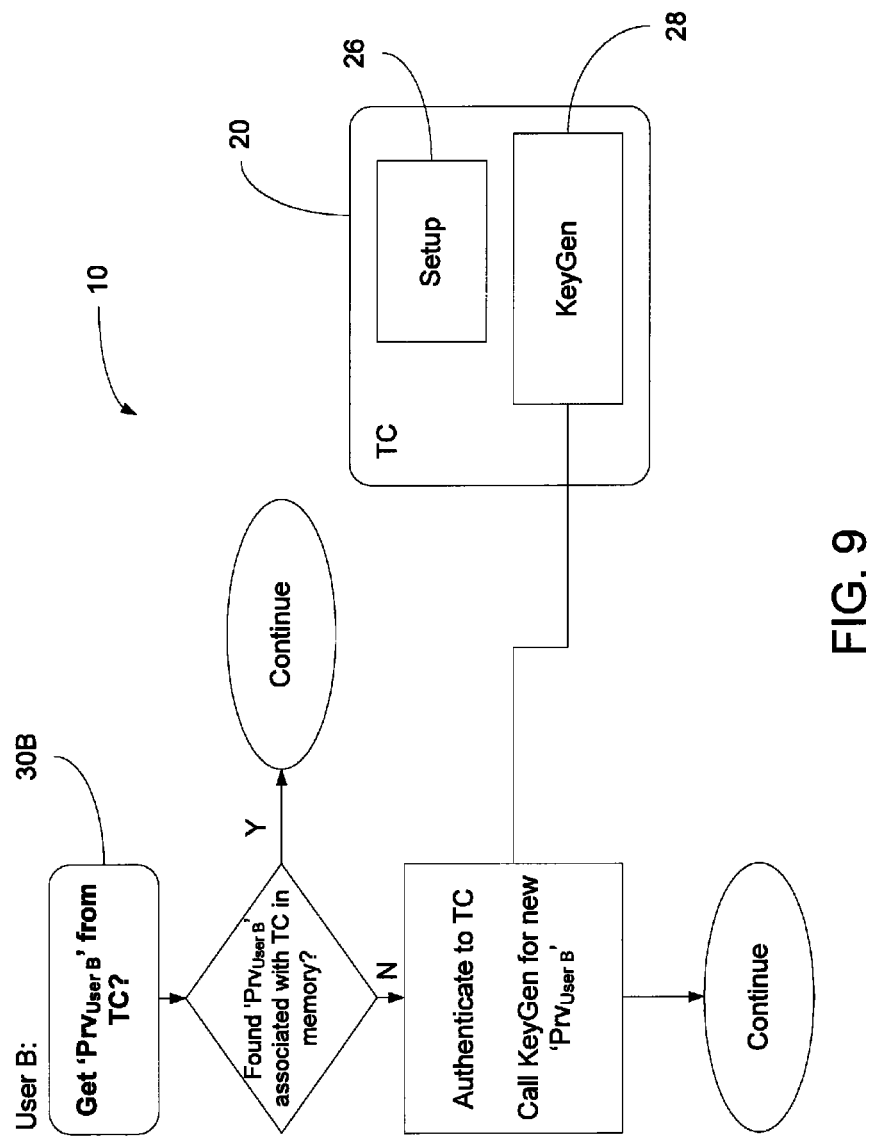
FIG. 9 shows a flowchart for a user labeled "User B" determining whether to get its private key from the trusted center in accordance with an embodiment of the present invention.

Next, the recipient determines, at step 812, whether it needs to get the recipient private key ($Prv_{recipient}$, or more specifically, $Prv_{User\ B}$) from the trusted center (TC). Referring briefly to FIG. 9, the recipient determines whether or not it needs to get the recipient private key ($Prv_{User\ B}$) for the particular trusted center (TC) by comparing whether any of the $Prv_{User\ B}$ the recipient may have stored in memory is associated with the identity string of the trusted center ($ID_{TC}$, i.e. "admin"). If not, user 30B authenticates itself with the trusted center 20 and calls the KeyGen() function to receive its own private key ($Prv_{User\ B}$) and the trusted center's public key $g_{pub}$, as previously described when registering a new user 30 in FIG. 4. At this time, the recipient may also receive an updated set of public parameters (PK) from the trusted center (TC).

Returning to FIG. 8, the recipient is now able to decrypt the different components V, U and W of the ciphertext (C) using the recipient private key ($Prv_{User\ B}$) and the public parameters (PK) in step 814. From these components, the recipient is able to retrieve the conventional encryption key ($\Sigma$) stored in the plaintext message "M" and "r", as described in the Auth-Decrypt ($Prv_{Id}$, PK, C) algorithm. Furthermore, in step 816, the recipient is operable to verify the sender of the message by inspecting the ciphertext (C) component Y. As described in the Auth-Decrypt ($Prv_{Id}$, PK, C) algorithm, the sender may be authenticated by calculating $Y=H_2(e(Prv_{sender},g_{recipient})^r)$. Therefore, because $e(g_{sender},Prv_{recipient})^r=e(Prv_{sender},g_{recipient})^r$, the recipient is operable to verify the sender if $Y=H_2(e(g_{sender},Prv_{recipient})^r)$ is satisfied, where $g_{sender}$ is generated locally from the sender identity string ($Id_{sender}$).

Finally, once the sender has been verified, the recipient is operable to restore the plaintext message (M) that contains the conventional encryption key (Σ) used by the conventional symmetric encryption scheme to encrypt the confidential data. The plaintext message (M) is restored using the random symmetric key (σ) and the symmetric key encryption function ε to easily determine D, as described above in the Auth-Decrypt ($Prv_{Id}$, PK, C) algorithm. Using the conventional encryption key (Σ) stored in the plaintext message (M), the recipient is operable to decrypt the transmitted message using the conventional symmetric encryption scheme. The decryption process is now complete.

The CLAE scheme as described above in a preferred embodiment of the present invention allows for the intended recipient to verify the sender's identity without storing or referring to any public key certificates. If the recipient successfully decrypts the ciphertext (C), the recipient can authenticate the sender based on the properties of the bilinear map (e) using the public parameters (PK) and the sender identity string ($Id_{sender}$) The authentication is an integral part of the CLAE scheme and it is more efficient to verify the sender in this manner than separately adding additional authentication components to the encryption process. The CLAE scheme according to the preferred embodiment of the present invention will ensure that not only is the sensitive data kept confidential, but also the sender of the confidential data is authentic. It should be noted that the authentication can be made optional by removing Y from the ciphertext (C) in an application where other authentication/digital signature schemes exist.

Dynamic Authority

The encryption key in CLAE scheme according to the preferred embodiment of the present invention is derived from dynamic parameters that are calculated from the trusted center's identifier, e.g. domain name, phone number, etc.

This new design yields greater flexibility in working with multiple authorities. The sender of encrypted data can enforce elaborate access conditions on the recipient before the recipient can decrypt and retrieve sensitive data. The sender can select not only who the recipient is but also how the recipient receives its private key ($Prv_{recipient}$). For example, a descriptive string may be combined or appended with the TC identity string ($Id_{TC}$) to increase the level of authentication required by the trusted center (TC) necessary for the recipient to obtain its private key ($Prv_{recipient}$) from the trusted center (TC). The recipient may be forced by the trusted center (TC) to further authenticate itself by satisfying this additional condition, provided by the descriptive string. The additional descriptive string may include the recipient's role, the recipient's age, the recipient's location, an expiry date and the like.

As an example, the sender can choose "bob@abc.com" as the recipient's identity of the encrypted message and can set "abc.com—December-2013" as the trusted center's public identity string ($TC_{Id}$) with an expiry date of December 2013. The sender's description of the TC identity string ($TC_{Id}$) is then enforced in the ciphertext (C) by locally computing a new $g_{admin-new}$, where $g_{admin-new}=H_1$("abc.com—December-2013"). If the sender possesses the public key of the trusted center (TC) $g_{pub}=g_{admin-new}^s$ corresponding to the new $g_{admin-new}$, it can proceed with Verifi-Encrypt( ), as described above. Otherwise, the sender is forced to obtain a new $g_{pub}$, as shown with respect to FIG. 7.

Beyond this date, the encryption algorithm would receive a new public key from the trusted center and would use it to generate new encryption keys. The recipient would then be forced to renew its private key from trusted center. This is very useful in conditions where the identity of users in the system will remain the same for an extended period, but it is beneficial for security reasons to have the private keys update periodically and/or frequently. On the receiver's side, if the same secret master key (s) is used to compute the new identity-based public encryption key of the trusted center $g_{pub-new}$, no change has to be made to the private key of the recipient ($Prv_{recipient}$) or the decryption algorithm. If, however, a different secret master key (s) is used, the recipient will be forced to receive a new private key corresponding to the secret master key of the trusted center (TC) with the new TC identity string ($Id_{TC-new}$), as shown in FIG. 9.

t should be noted that the same encryption algorithm can be used if the sender decides to use a different server (trusted authority) such as "xyz.com" instead of "abc.com". The only difference in the encryption algorithm would be in using the identity-based public encryption key of the new trusted center ($g_{pub}$) of the new trusted center and everything else remains the same.

Exchange of Trust

As discussed above, the new CLAE scheme allows the sender to communicate privately with any recipient under various trusted authorities. For example, the sender can send an encrypted message from the "abc.com" domain (with secret master key s) to someone in the "xyz.com" domain (with secret master key s'). Two different cases can happen depending if s=s'.

a. If s=s': the sender uses the public key of the new trusted center (s') in the encrypt. Everything else in the encryption proceeds exactly the same as before with the new public key (s'). No further changes are required in the decryption algorithm and the intended recipients decrypts the ciphertext as before using the same private key ($Prv_{Id}$).

b. If s≠s': the sender uses the public key of the new trusted center (s') in the encrypt. Everything else in the encryption proceeds exactly the same as before with the new public key (s'). The intended recipient is now forced to authenticate itself to the new trusted center, picked by the sender, in order to receive the corresponding new private key $Prv'_{Id}$. No further changes are required in the decryption algorithm and the intended recipients decrypts the ciphertext (C) as before using the new private key $Prv'_{Id}$.

In this manner, the sender has control of which trusted center (TC) to associate with and can force the recipient to authenticate to a trusted center (TC) of its choosing. Accordingly, the sender can rely on the additional security of choosing its preferred trusted center to generate and supply the private key ($Prv_{Id}$) to the recipient. The onus can then be placed on the recipient to associate with reliable trusted centers and authenticate itself to the trusted center (TC), selected by the sender, to receive the private key for the recipient ($Prv_{recipient}$).

Although this disclosure has described and illustrated certain preferred embodiments of the invention, it is also to be understood that the invention is not restricted to these particular embodiments rather, the invention includes all embodiments which are functional, or mechanical equivalents of the specific embodiments and features that have been described and illustrated herein. The scope of the claims should not be limited to the preferred embodiments set forth in the examples, but should be given the broadest interpretation consistent with the description as a whole.

It will be understood that, although various features of the invention have been described with respect to one or another of the embodiments of the invention, the various features and embodiments of the invention may be combined or used in conjunction with other features and embodiments of the invention as described and illustrated herein. Furthermore, while the various methods described herein may refer to a specific order and number of steps, it should be understood that the order and/or number of method steps described herein should not be construed as limiting, as other orders and/or number of steps would be understood by persons skilled in the art.

The embodiments of the invention in which an exclusive property or privilege is claimed is defined as follows:

1. A method of sending an encrypted message by a sender having a sender identity string ($Id_{sender}$) to a recipient over a network using identity-based encryption, the method comprising:
   identifying a trusted center (TC) by a TC identity string ($Id_{TC}$), the trusted center having an identity-based public encryption key of the trusted center ($g_{pub}$) based on the TC identity string ($Id_{TC}$);
   determining if the sender has a sender private key ($Prv_{sender}$) and a plurality of public parameters (PK) for the trusted center (TC), the public parameters (PK) including the identity-based public encryption key of the trusted center ($g_{pub}$) and a bilinear map (e);
   verifying the public parameters (PK) of the trusted center (TC) by the sender using the TC identity string ($Id_{TC}$) prior to encrypting a plaintext message (M), wherein the verifying the public parameters (PK) by the sender comprises comparing values of the bilinear map (e) calculated with variables comprising the sender private key ($Prv_{sender}$) and the identity-based public encryption key of the trusted center ($g_{pub}$);
   identifying the recipient by a recipient identity string ($Id_{recipient}$), the recipient having an identity-based public encryption key of the recipient ($g_{recipient}$) for the trusted center (TC) based on the recipient identity string ($Id_{recipient}$);
   generating the identity-based public encryption key of the recipient ($g_{recipient}$) using the public parameters (PK) and the recipient identity string ($Id_{recipient}$);
   encrypting the plaintext message (M) as ciphertext (C) using the public parameters (PK), a random symmetric key (σ) and the identity-based public encryption key of the recipient ($g_{recipient}$), the ciphertext (C) including the encrypted message; and
   transmitting the ciphertext (C) to the recipient over the network.

2. The method of claim 1, wherein the public parameters (PK) are verified if $$e(Prv_{sender}, g_{pub}) = e(g_{sender}, g_{Id_{TC}}),$$

where $g_{sender}$ is based on the sender identity string ($Id_{sender}$) and $g_{Id_{TC}}$ is based on the TC identity string ($Id_{TC}$).

3. The method of claim 2, wherein the sender private key ($Prv_{sender}$) and the identity-based public encryption key of the trusted center ($g_{pub}$) are provided by the trusted center (TC) and $g_{sender}$ and $g_{Id_{TC}}$ are generated locally by the sender during the verifying step.

4. The method of claim 1, wherein the public parameters (PK) further include a first cryptographic hash function ($H_1$), a second cryptographic hash function ($H_2$), a third cryptographic hash function ($H_3$), a symmetric key encryption function (I.I), and G and $G_T$, where G and $G_T$ are groups of order p and where the bilinear map (e) satisfies:

$$e: G \times G \to G_T.$$

5. The method of claim 1, wherein the ciphertext (C) includes an authentication component (Y) for authenticating the sender once the ciphertext (C) is received by the recipient.

6. The method of claim 5, wherein the authentication component (Y) is based on the sender private key ($Prv_{sender}$) and the identity-based public encryption key of the recipient ($g_{recipient}$), and wherein the recipient is operable to verify the sender using the public parameters (PK), the sender identity string ($Id_{sender}$), and a recipient private key ($Prv_{recipient}$) obtained from the trusted center (TC).

7. The method of claim 1, wherein the sender can specify an expiry date for the identity-based public encryption key of the trusted center ($g_{pub}$), whereby after the expiry date, the recipient is forced to authenticate with the trusted center (TC) to obtain a new recipient private key ($Prv_{recipient-new}$).

8. The method of claim 1, wherein the sender can specify a descriptive string to append to the TC identity string ($Id_{TC}$), whereby the descriptive string is used by the trusted center (TC) to require additional levels of authentication from the recipient in order for the trusted center (TC) to provide a recipient private key ($Prv_{recipient}$) to the recipient.

9. The method of claim 8, wherein the descriptive string is selected from the group consisting of: a role of the recipient, an age of the recipient, a location of the recipient and an expiry date.

10. The method of claim 1, wherein the plaintext message (M) is a conventional encryption key.

11. A method for using certificate-less encryption (CLAE) using identity-based encryption in a network system between a sender having a sender identity string ($Id_{sender}$) and a recipient having a recipient identity string ($Id_{recipient}$), the method comprising:
   at the sender:
      identifying a trusted center (TC) by a TC identity string ($Id_{TC}$), the trusted center having an identity-based public encryption key of the trusted center ($g_{pub}$) based on the TC identity string ($Id_{TC}$);
      determining if the sender has a sender private key ($Prv_{sender}$) and a plurality of public parameters (PK) for the trusted center (TC), the public parameters (PK) including the identity-based public encryption key of the trusted center ($g_{pub}$) and a bilinear map (e);
      verifying the public parameters (PK) of the trusted center (TC) using the TC identity string ($Id_{TC}$) prior to encrypting a plaintext message (M), wherein the verifying the public parameters (PK) at the sender comprises comparing values of the bilinear map (e) calculated with variables comprising the sender private key ($Prv_{sender}$) and the identity-based public encryption key of the trusted center ($g_{pub}$);
      identifying the recipient by a recipient identity string ($Id_{recipient}$), the recipient having an identity-based public encryption key of the recipient ($g_{recipient}$) for the trusted center (TC) based on the recipient identity string ($Id_{recipient}$);
      generating the identity-based public encryption key of the recipient ($g_{recipient}$) using the public parameters (PK) and the recipient identity string ($Id_{recipient}$);
      encrypting the plaintext message (M) as ciphertext (C) using the public parameters (PK), a random symmetric key (σ) and the identity-based public encryption key of the recipient ($g_{recipient}$), the ciphertext (C) including the encrypted message; and transmitting the ciphertext (C) to the recipient over the network; and at the recipient:
receiving the ciphertext (C) from the sender over the network system;
determining if the recipient has a recipient private key ($\text{Prv}_{recipient}$) and the public parameters (PK) for the trusted center (TC);
decrypting the ciphertext (C) to obtain the plaintext message (M) using the public parameters (PK), and the recipient private key ($\text{Prv}_{recipient}$).

12. The method of claim 11, wherein the method further comprises, at the recipient, verifying the sender using the ciphertext (C), the public parameters (PK), the sender identity string ($\text{Id}_{sender}$), and the recipient private key ($\text{Prv}_{recipient}$).

13. A system for sending an encrypted message over a network using identity-based encryption, the system comprising:

a trusted center (TC) having a TC identity string ($\text{Id}_{TC}$), a sender having a sender identity string ($\text{Id}_{sender}$), and a recipient having a recipient identity string ($\text{Id}_{recipient}$);

wherein the trusted center (TC) has a first memory and one or more processors configured for:
generating a plurality of public parameters (PK) and a secret master key (s) from a security parameter ($\lambda$), the public parameters (PK) including a bilinear map (e) and an identity-based public encryption key of the trusted center ($g_{pub}$) based on the TC identity string ($\text{Id}_{TC}$);
receiving a request from a requestor;
if the request from the requestor contains an identifier (Id) identifying the requestor, generating a private key ($\text{Prv}_{Id}$) based on the identifier (Id) and the secret master key (s); and transmitting the private key ($\text{Prv}_{Id}$) to the requestor over the network system; and
if the request from the requestor includes a request for the public parameters (PK), transmitting the public parameters (PK) to the requestor over the network system;

wherein the sender has a second memory and one or more processors configured for:
identifying the trusted center (TC) by the TC identity string ($\text{Id}_{TC}$),
determining if the sender has a sender private key ($\text{Prv}_{sender}$) and the public parameters (PK) for the trusted center (TC),
verifying the public parameters (PK) of the trusted center (TC) using the TC identity string ($\text{Id}_{TC}$) prior to encrypting a plaintext message (M), wherein the verifying the public parameters (PK) by the sender comprises comparing values of the bilinear map (e) calculated with variables comprising the sender private key ($\text{Prv}_{sender}$) and the identity-based public encryption key of the trusted center ($g_{pub}$);
identifying the recipient by the recipient identity string ($\text{Id}_{recipient}$), the recipient having an identity-based public encryption key of the recipient ($g_{recipient}$) for the trusted center (TC) based on the recipient identity string ($\text{Id}_{recipient}$);
generating the identity-based public encryption key of the recipient ($g_{recipient}$) using the public parameters (PK) and the recipient identity string ($\text{Id}_{recipient}$);
encrypting the plaintext message (M) as ciphertext (C) using the public parameters (PK), a random number ($\sigma$) and the identity-based public encryption key of the recipient ($g_{recipient}$), the ciphertext (C) including the encrypted message; and
transmitting the ciphertext (C) to the recipient over the network; and wherein the recipient has a third memory and one or more processors configured for:
receiving the ciphertext (C) from the sender over the network system;
determining if the recipient has a recipient private key ($\text{Prv}_{recipient}$) and the public parameters (PK) for the trusted center (TC); and
decrypting the ciphertext (C) to obtain the plaintext message (M) using the public parameters (PK), and the recipient private key ($\text{Prv}_{recipient}$).

14. The system of claim 13, wherein the plurality of public parameters (PK) further include the identity-based public encryption key of the trusted center ($g_{pub}$) based on the TC identity string ($\text{Id}_{TC}$), a first cryptographic hash function ($H_1$) a second cryptographic hash function ($H_2$), a third cryptographic hash function ($H_3$), a symmetric key encryption function ($\llcorner\lrcorner$), and G and $G_T$, where G and $G_T$ are groups of order p and where the bilinear map (e) satisfies:

$$e: G \times G \rightarrow G_T.$$

15. A computer program product comprising a computer readable memory storing computer executable instructions thereon that, when executed by a computer, perform the method steps of:

identifying a trusted center (TC) by a TC identity string ($\text{Id}_{TC}$), the trusted center having an identity-based public encryption key of the trusted center ($g_{pub}$) based on the TC identity string ($\text{Id}_{TC}$);
determining if a sender has a sender private key ($\text{Prv}_{sender}$) and a plurality of public parameters (PK) for the trusted center (TC), the public parameters (PK) including the identity-based public encryption key of the trusted center ($g_{pub}$) and a bilinear map (e);
verifying the public parameters (PK) of the trusted center (TC) by the sender using the TC identity string ($\text{Id}_{TC}$) prior to encrypting a plaintext message (M) wherein the verifying the public parameters (PK) by the sender comprises comparing values of the bilinear maps (e) calculated with variables comprising the sender private key ($\text{Prv}_{sender}$) and the identity-based public encryption key of the trusted center ($g_{pub}$);
identifying a recipient by a recipient identity string ($\text{Id}_{recipient}$), the recipient having an identity-based public encryption key of the recipient ($g_{recipient}$) for the trusted center (IC) based on the recipient identity string ($\text{Id}_{recipient}$);
generating the identity-based public encryption key of the recipient ($g_{recipient}$) using the public parameters (PK) and the recipient identity string ($\text{Id}_{recipient}$);
encrypting the plaintext message (M) as ciphertext (C) using the public parameters (PK), a random number ($\sigma$) and the identity-based public encryption key of the recipient ($g_{recipient}$), the ciphertext (C) including an encrypted message based on the plaintext message (M); and
transmitting the ciphertext (C) to the recipient over a network.

* * * * *